FIG. I

ALBIN F. TURBAK
INVENTOR.

BY David V Mumma
Neal J Mozely
his attorney

ALBIN F TURBAK
*INVENTOR.*

United States Patent Office
3,682,661
Patented Aug. 8, 1972

---

3,682,661
EDIBLE VEGETABLE PROTEIN CASING
Albin F. Turbak, 215 Denvale Drive,
Danville, Ill. 61832
Filed Jan. 2, 1970, Ser. No. 62
Int. Cl. A22c 13/00
U.S. Cl. 99—176                                 7 Claims

ABSTRACT OF THE DISCLOSURE

An edible vegetable protein sausage casing is produced by dispersing a film-forming vegetable protein in water, extruding the vegetable protein dispersion through an annular die to form a vegetable protein tube, and coagulating and tanning the extruded vegetable protein tube.

BACKGROUND OF THE INVENTION

Field of the invention

This invention relates to new and useful improvements in artificial sausage casings and more particularly to the production of artificial sausage casings from film-forming vegetable protein in which the casings are tanned.

Description of the prior art

Natural casings are prepared from the intestines of various edible animals, primarily cattle, hogs and sheep. The intestines are removed from the slaughtered animal and thoroughly cleaned by processes well known in the art. Natural casings, which have been thoroughly cleaned, are stuffed with various sausage meat compositions and formed into sausage links in preparation for cooking. The sausages which are thus formed are cooked and the sausage casing eaten with the cooked sausage. In the preparation of certain smoked or precooked sausages, such as frankfurters and the like, the sausage is cooked or smoked or otherwise processed by the meat packer to render it edible without further treatment by the consumer.

Prior to about 1925, substantially all sausage casings were natural casings prepared from animal intestines. Since that time, there have been developed several types of synthetic sausage casings, primarily of regenerated cellulose, which are used in the preparation of the major portion of sausages which are made and sold today. Cellulose casings are used in the preparation of large sausages such as bolognas, salamis, and the like, and are removed from the sausage by the customer at the time of final preparation for eating. Regenerated cellulose casings are also used in the preparation of frankfurter sausages where the casing is stuffed with sausage emulsion, linked, smoked and cooked, and the casing removed from the finished sausage. Regenerated cellulose casings have not proved satisfactory for the processing of pork sausages inasmuch as cellulose is not palatable with the sausage and does not transmit the fat which is released from the sausage during cooking. As a result, there has been some demand for an artificial sausage casing which is edible and which has the properties desired in a casing to be used in the processing of pork sausages.

Over a period of many years, thick wall synthetic sausage casings have been prepared from animal collagen. Casings made of collagen have been prepared by processing the corium layer of animal hides to break the collagen into a fibrous structure and extrude the collagen fibers in the form of a doughy mass to produce tubular casings. The casings which have been prepared in this manner have been hardened by treatment with aluminum salts followed by formaldehyde and/or other aldehydes and have been used as removable casings for processing various sausages. These casings have not been edible even though collagen itself is edible.

More recently, thinner wall edible sausage casings of collagen have been prepared and sold in commercial quantities. In the manufacture of edible collagen casings, one approach uses a collagen source material which has not been subjected to a liming treatment. Another technique makes use of limed collagen source material by observing special processing methods. Although both methods are capable of producing casings which are edible and have other advantageous properties adapting them for use as sausage casings, e.g. heat-shrinkable and fat-transmittable, these methods do suffer from the disadvantage of requiring relatively extensive and involved processing and handling procedures.

In addition to collagen, other materials have been suggested as possible candidates in producing edible casings. Examples of such non-collagen materials include amylose, alginic acid, and casein. In spite of some attractive features, however, these materials have not met with much success in producing suitable casings due to one or more drawbacks stemming from a lack of adequate supplies of primary and/or requisite supplemental materials (e.g. plasticizers) or certain unsuitable properties of casings formed from such materials. Casings formed from amylose, for example, have undesirably low wet strength, poor pliability, poor heat shrinkability, and high resistance to fat transmission. Alginic acid, on the other hand, suffers from the disadvantage of forming films which are difficult to chew.

It is, therefore, the primary object of this invention to provide a new and improved sausage casing.

Another object of this invention is to provide a new and improved sausage casing from a readily available material.

Still another object of this invention is to provide a new sausage casing having valuable properties.

Yet another object of this invention is to provide a new edible sausage casing.

A further object of the invention is to provide an edible casing which is easily chewed, heat-shrinkable, and/or fat-transmittable.

Another object of this invention is to provide a new casing which has high strength, is stretch-resistant, and demonstrates resistance to water and similar solvents.

SUMMARY OF THE INVENTION

This invention is based upon the discovery that satisfactory edible vegetable protein sausage casings can be prepared by extruding a dispersion of an undenatured film-forming vegetable protein through an annular die into a suitable coagulating bath and then treating the resultant extruded and coagulated tube with a suitable solution of a tanning agent to harden and tan the vegetable protein film of the casing. The tanned vegetable protein casings have tensile strength suitable for further processing and stuffing and heat shrinkage properties which resist splitting during cooking of the stuffed sausage casing.

BRIEF DESCRIPTION OF THE DRAWINGS

The process for the preparation and tanning of collagen casings in accordance with this invention will be understood more fully by reference to the following description and the accompanying drawings, in which.

DESCRIPTION OF THE PREFERRED EMBODIMENTS

Figure 1:
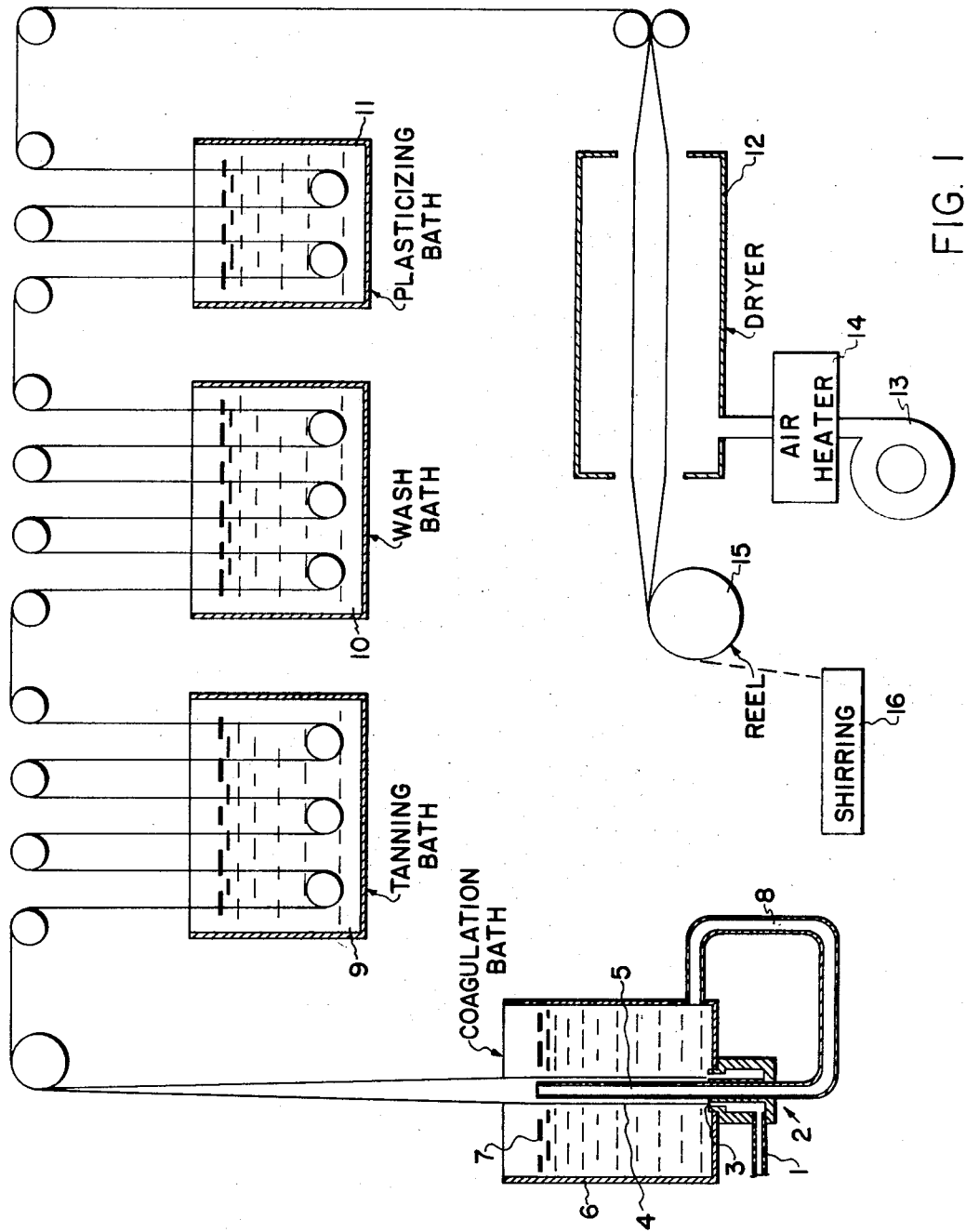
FIG. 1 is a flow diagram illustrating schematically the more important steps in the extrusion, tanning, and processing of the edible vegetable protein casings of the present invention.

In accordance with the present method, a dispersion of a film-forming vegetable protein material initially is provided for extrusion into a tubular film. The film-forming dispersions generally suitable for use in the present invention are those in which individual chains of the protein molecules have been freed from the fibrous and/or corpuscular aggregate structures which naturally occur to form a dispersion of protein molecule chains which are capable of reassociating, when the dispersion is contacted with a coagulating liquid, into a fibrillar structure. As is known, such film-forming properties are characteristics of undenatured protein material having an average degree of polymerization (D.P.) of at least about 50, and more usually at least about 100 and in the range of from about 200 to about 600. Such materials are well known to the art and may be prepared by suspending vegetable protein materials in a protonated liquid, preferably water, and treating the materials, with or without shear, with acidic or alkaline swelling agents, preferably alkalis such as sodium hydroxide. The concentration of vegetable protein in such film-forming dispersions generally range up to 35% and more usually is in the range of from about 10% to about 30%.

Specific examples of vegetable protein material for use in providing the vegetable protein dispersion extruded in accordance with the present invention include, without limitation, edible vegetable protein concentrates of sufficient molecular weight derived from leguminous (i.e. primarily grown for food) plants commonly classed as vegetables (e.g. peas and beans, such as soybeans), grains (e.g. corn, sorghum, wheat, and oats), nuts (e.g. peanuts), and fruit (e.g. cranberries), as well as non-leguminous plants such as cotton. Protein concentrates from these and other vegetable sources are commercially available materials. In general, such concentrates are obtained from the roots, seeds, or fruit of the respective plants by conventional techniques involving comminution, mechanical separation of cellulosic fibrous material, and recovery of concentrated protein fractions from the resultant substance mixture containing non-proteinaceous materials such as minerals, polysaccharides, fats, and lipids by solvent extraction, ion exchange, and the like. Such protein concentrates employed in the preparation of edible casings in the present invention usually contain less than about 20%, and preferably less than about 10%, of non-proteinaceous material. The vegetable protein materials more preferred for use in providing the vegetable protein dispersions extruded in the present method are protein concentrates of the described preferred compositions derived from corn, wheat, peanuts, or soybeans.

As stated, in forming the vegetable protein dispersion to be extruded, the preferred "spinnable" dispersions are formed by dispersing the protein material in a protonated liquid containing an alkali. Alkali metal hydroxides such as sodium hydroxide and potassium hydroxide form the preferred alkaline dispersing media, although any other non-toxic alkalis could be substituted in part or in total therefor. The concentration of alkali required in particular embodiments varies depending primarily upon the nature of the protein employed. In general, the pH of the dispersion employed is moderately alkaline, e.g. above 7 and ranging up to about 10.0. Strongly alkaline media, e.g. those having a pH about 11.0 are avoided to preclude undesirable degradation of the protein polymers. Sufficient alkali must be used, however, to achieve proper swelling and intermolecular separation and impart "spinnability" of the protein material in the dispersion ("dispersion" herein includes dispersions and solutions as normally referred to in polymer technology). To avoid undesirable degradation of the protein, the temperature at which the dispersion is formed and maintained before extrusion should also be controlled. Usually temperatures below about 50° C. are suitable with preferred temperature being in the range of from about 5° C. to about 25° C.

The liquid vehicle of the vegetable protein dispersion preferred for use in the present method is water. Other protonated non-aqueous liquids which are solvents for proteins and are suitable for use include methanol, ethanol, liquid ammonia, dimethylformamide, methylamine, aniline, and the like.

In accordance with the present method and as illustrated in FIG. 1, the protein dispersion provided is passed through inlet conduit 1 into die 2 having an annular die outlet 3 and is extruded through outlet 3. In order to obtain maximum strength in the product casing, the vegetable protein dispersion is preferably extruded through a die having rotating inner and/or outer parts which is well known in the prior art in the preparation of casings, vide Becker U.S. Pat. 2,046,541. The vegetable protein dispersion is extruded from die 2 upwardly through the bottom of a container 6 and a bath of liquid 7 which effects coagulation of the extruded tubular casing 4. Coagulating liquid is circulated to the inside of casing 4 by means of tube 5 which extends through die 2 and upwardly within the extruded casing and which connects to tube 8 communicating with the bottom of coagulating bath container 6.

The composition of the coagulating bath 7 suitably may vary and may include liquids which coagulate the extruded vegetable protein tube by neutralization of the protein swelling agent, removal of the dispersion vehicle, or both. Specific examples of suitable coagulation baths include aqueous solutions, e.g. pH of 2–5, of acids such as sulfuric acid and hydrochloric acid, concentrated to saturated aqueous solutions of salts such as sodium, potassium, or ammonium sulfate or chlorides, and organic solvents such as acetone which are miscible with the dispersion liquid vehicle but are non-solvents for the vegetable protein.

Casing 4 which is coagulated in bath 7 then passes over a series of rollers and is directed into a tanning bath 9. In tanning bath 9, casing 4 is treated with a non-toxic tanning agent to tan or harden the vegetable protein tube into a casing, which when further processed, is suitable for use as a sausage casing.

In accordance with the present invention, any non-toxic tanning agent effective to impart the desired strength to the vegetable protein casing can be used. The more effective tanning agents include aqueous solutions of edible non-toxic heavy metal salts, such as solutions containing up to about 20% aluminum sulfate, aluminum nitrate, ferric sulfate, ferric nitrate, ferric ammonium sulfate, ferric chloride, and any of the other ferric halides; and chemically bound aldehydes and dialdehydes, such as solutions containing up to 25% formaldehyde, or liquid smoke. Heavy metal salts when they are employed should be olated by addition of about 10–40% basicity by use of calculated amounts of bases such as sodium carbonate, sodium bicarbonate, aqueous ammonia, dilute castic soda, etc., either directly or in the presence of various complexing or chelating reagents such as the sodium salts of hydroxy lower alkanoic acids or sodium salts of ethylenediaminetetraacetic acid, e.g. sodium gluconate, sodium lactate, sodium citrate, sodium tartrate, disodium salt of EDTA, and the like. The desired degree of olation is produced by controls of the basicity and heating the complexed or chelated metal solutions. Where not already buffered, as in the case of the described olated materials, the tanning bath may be buffered to a suitable pH, e.g. from about 4–7, with an inert buffer salt, e.g. sodium formate, sodium citrate, or sodium hexametaphosphate. Tanning baths separately containing two or more of the various tanning agents also can be used in series to treat the casing.

Figure 2:
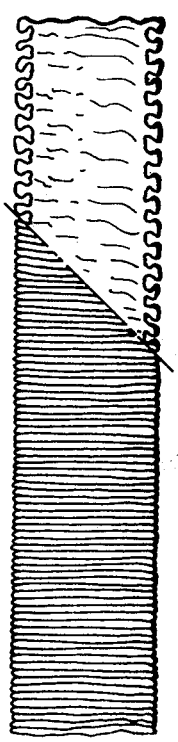
FIG. 2 is an extruded edible vegetable protein casing prepared in accordance with this invention as processed in a shirred form.

From the tanning bath 9, the casing passes through a wash bath 10 where residual salts and/or excess tanning agents are washed out of the casing. The casing is then passed through plasticizing bath 11 which introduces a small amount of a plasticizer such as glycerin into the casing. From the plasticizing bath 11, the casing passes through dryer 12 where it is inflated and dried with the aid of air circulated by fan or blower 13 through air heater 14. After leaving dryer 12, the casing may be rolled up on reel 15, but is preferably passed directly to a shirring machine shown diagrammatically as 16 where it is shirred into short strands as illustrated in FIG. 2 of the drawings. If the casing is first rolled up on reels, it may be subsequently shirred if desired. The shirring machine which is used for preparation of shirred strands of casing may be of any suitable design such as the types commonly used in the shirring of regenerated cellulose sausage casings as noted above.

Figure 3:
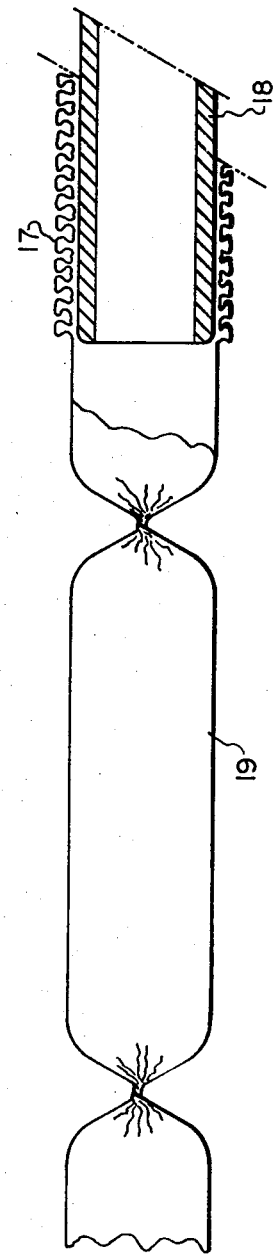
FIG. 3 is a schematic view showing the filling of the casing with sausage meat on an extrusion horn or nozzle and the preparation of sausage links therefrom.

After the casing is shirred into individual short strands, it is packaged and cured by heating at 60°–80° C. in an atmosphere of 20–50% relative humidity for several hours prior to shipment to the meat packer. In FIG. 3 the stuffing of the casing is illustrated. A strand of edible vegetable protein casing 17 is placed on a tubular stuffing horn 18 which is connected to a pressurized source of sausage emulsion (not shown). The sausage emulsion is passed through the stuffing horn 18 into the end of casing 17 and the casing is filled with sausage meat and twisted at suitable intervals to provide sausage links 19. The links may be severed from each other and packaged in a suitable overwrap following conventional meat packaging techniques. When the sausage is cooked by the consumer, the casing is found to be quite strong and shrinks with the meat during cooking. The casing may be prestuck, if desired, to permit more rapid release of fat during the cooking of the sausages. Casing which is prepared in this manner has been found to have a shrinkage temperature, viz, 60°–80° C. and thus does not shrink excessively during cooking.

The following nonlimiting examples are illustrative of the application of this invention in the preparation of a satisfactory edible vegetable protein casing:

Example 1

In this example, the preparation of edible sausage casings from corn protein is illustrated.

A 15% dispersion of a commercial corn protein product containing 90% protein in an aqueous 2% sodium hydroxide solution is prepared and homogenized. The resultant swollen protein dispersion is then pumped under pressure through the extrusion die as previously described into a coagulating bath consisting of 42% ammonium sulfate (sodium sulfate can also be used) in water. When the dispersion is extruded as a thin-walled tube into this concentrated solution of ammonium sulfate, the tube is dehydrated and collapsed to form a film which is sufficiently coherent for further processing. As shown in FIG. 1 of the drawings, the coagulation bath is circulated both inside and outside the tube to maintain the tube in an inflated condition and insure proper coagulation of the casing both on the inside and outside.

After the film is coagulated in the ammonium sulfate solution, it is necessary to tan the film to give the film sufficient strength for further processing and for stuffing with sausage meat. If the film were taken from the ammonium sulfate coagulating bath and were dried, a film would be produced which has moderate strength in the dry state but which would be significantly weakened upon contact with water. It is, therefore, necessary for the casing to be tanned or hardened to provide the wet and dry strength in the finished product required in an edible casing.

From the coagulation bath, the casing next passes into a tanning bath which comprises a solution of 10% ferric ammonium sulfate and 20% ammonium sulfate and having a pH of 3.0. In this bath, the casing is hardened or tanned. The casing passes over a series of rollers in the ferric ammonium sulfate solution to provide multiple passes giving a residence time of at least 1 minute in the bath.

From the tanning bath, the casing then passes into a wash bath where it is maintained for a period of about 10 minutes by a multiple pass arrangement. After washing, the casing passes through a plasticizing bath consisting of 5% glycerin in water. From the plasticizing bath the casing passes through a dryer where it is inflated with compressed air and dried by circulation of heated air over the surface of the inflated casing. The casing is dried by air maintained at a temperature of 70° C. circulated at a rate of 200 feet per minute.

After drying, the casing is preferably shirred. It may be first reeled and then shirred prior to packaging.

Casings made by the above described method are uniform in diameter and in wall thickness. The tanning of the casing with ferric ammonium sulfate solution is effective to produce a strong coherent film having a high longitudinal and transverse strength, both dry and rewet. The casing prepared as described above could be shirred without difficulty using a shirring machine of the type used for the shirring of regenerated cellulose casing. The shirred casing could be stuffed, linked, and cooked without difficulty.

Example 2

In this example, the preparation of another edible sausage casing from corn protein is illustrated.

A 15% dispersion of a commercial corn protein product containing 90% protein in an aqueous 2% sodium hydroxide solution is prepared and homogenized. The resultant swollen protein dispersion is then pumped under pressure through the extrusion die as previously described into a coagulating bath consisting of 35% ammonium sulfate and 2% sulfuric acid (sodium sulfate can also be used) in water. When the dispersion is extruded as a thin-walled tube into this concentrated solution of ammonium sulfate, the tube is dehydrated and collapsed to form a film which is sufficiently coherent for further processing. As shown in FIG. 1 of the drawings, the coagulation bath is circulated both inside and outside the tube to maintain the tube in an inflated condition and insure proper coagulation of the casing both on the inside and outside.

After the film is coagulated in the ammonium sulfate solution, it is necessary to tan the film to give the film sufficient strength for further processing and for stuffing with sausage meat. If the film were taken from the ammonium sulfate coagulating bath and were dried, a film would be produced which has moderate strength in the dry state but which would be considerably weakened upon contact with water. It is, therefore, necessary for the casing to be tanned or hardened to provide the wet and dry strength in the finished product required in an edible casing.

From the coagulation bath, the casing next passes into a tanning bath which comprises an aqueous solution of 10% ferric chloride and having a pH of 2.5. This solution is made 20% basic by adding the calculated amount of sodium bicarbonate in the presence of an equimolar amount of disodium EDTA and boiled for 60 minutes. The resulting solution has the desired degree of olation. In this bath, the casing is hardened or tanned. The casing passes over a series of rollers in the ferric chloride solution to provide multiple passes given a residence time of at least 1 minute in the bath.

From the tanning bath, the casing then passes into a wash bath where it is maintained for a period of about 10 minutes by a multiple pass arrangement. After washing, the casing passes through a plasticizing bath consisting of 5% glycerin in water. From the plasticizing bath the casing passes through a dryer where it is inflated with compressed air and dried by circulation of heated air over the surface of the inflated casing. The casing is dried by air maintained at a temperature of 70° C. circulated at a rate of 200 feet per minute.

After drying, the casing is preferably shirred. It may be first reeled and then shirred prior to packaging.

Casings made by the above described method are uniform in diameter and in wall thickness. The tanning of the casing with ferric chloride solution is effective to produce a strong coherent film having a high longitudinal and transverse strength, both dry and rewet. The casing prepared as described above could be shirred without difficulty using a shirring machine of the type used for the shirring of regenerated cellulose casing. The shirred casing could be stuffed, linked, and cooked without difficulty.

Example 3

In this example, the preparation of another edible sausage casing from corn protein is illustrated.

A 15% dispersion of a commercial corn protein product containing 90% protein in an aqueous 2% sodium hydroxide solution is prepared and homogenized. The resultant swollen protein dispersion is then pumped under pressure through the extrusion die as previously described into a coagulating bath consisting of 40% sodium sulfate in water. When the dispersion is extruded as a thin-walled tube into this concentrated solution of sodium sulfate, the tube is dehydrated and collapsed to form a film which is sufficiently coherent for further processing. As shown in FIG. 1 of the drawings, the coagulation bath is circulated both inside and outside the tube to maintain the tube in an inflated condition and insure proper coagulation of the casing both on the inside and outside.

After the film is coagulated in the sodium sulfate solution, it is necessary to tan the film to give the film sufficient strength for further processing and for stuffing with sausage meat. If the film were taken from the sodium sulfate coagulating bath and were dried, a film would be produced which has moderate strength in the dry state but which would be considerably weakened upon contact with water. It is, therefore, necessary for the casing to be tanned or hardened to provide the wet and dry strength in the finished product required in an edible casing.

From the coagulation bath, the casing next passes into a tanning bath which comprises an aqueous 5% solution of glutaraldehyde buffered to a pH of about 5.3 with sodium hexametaphosphate. In this bath, the casing is hardened or tanned. The casing passes over a series of rollers in the tanning solution to provide multiple passes giving a residence time of at least 0.5 minute in the bath.

From the tanning bath, the casing then passes into a wash bath where it is maintained for a period of about 10 minutes by a multiple pass arrangement. After washing, the casing passes through a plasticizing bath consisting of 5% glycerin in water. From the plasticizing bath the casing passes through a dryer where it is inflated with compressed air and dried by circulation of heated air over the surface of the inflated casing. The casing is dried by air maintained at a temperature of 70° C. circulated at a rate of 200 feet per minute.

After drying, the casing is preferably shirred. It may be first reeled and then shirred prior to packaging.

Casings made by the above described method are uniform in diameter and in wall thickness. The tanning of the casing with glutaraldehyde solution is effective to produce a strong coherent film having a high longitudinal and transverse strength, both dry and rewet. The casing prepared as described above could be shirred without difficulty using a shirring machine of the type used for the shirring of regenerated cellulose casing. The shirred casing could be stuffed, linked, and cooked without difficulty.

Example 4

In this example, the preparation of edible sausage casings from corn protein is illustrated.

A 15% dispersion of a commercial corn protein product containing 90% protein in an aqueous 2% sodium hydroxide solution is prepared and homogenized. The resultant swollen protein dispersion is then pumped under pressure through the extrusion die as previously described into a coagulating bath consisting of an aqueous solution of 70% acetone (Sodium sulfate can also be used) in water. When the dispersion is extruded as a thin-walled tube into this coagulating bath, the tube is dehydrated and collapsed to form a film which is sufficiently coherent for further processing. As shown in FIG. 1 of the drawings, the coagulation bath is circulated both inside and outside the tube to maintain the tube in an inflated condition and insure proper coagulation of the casing both on the inside and outside.

After the film is coagulated in the acetone solution, it is necessary to tan the film to give the film sufficient strength for further processing for stuffing with sausage heat. If the film were taken from the coagulating bath and were dried, a film would be produced which has moderate strength in the dry state but which would be considerably weakened upon contact with water. It is, therefore, necessary for the casing to be tanned or hardened to provide the wet and dry strength in the finished product required in an edible casing.

From the coagulation bath, the casing next passes into a tanning bath which comprises an aqueous solution containing 10–20% aluminum sulfate, $Al_2(SO_4)_3 \cdot 18H_2O$, 3–7% sodium citrate and 3–7% sodium carbonate. The tanning bath is formulated so that an aluminum complex is formed which is about one-third to two thirds basic and a bath having a pH of about 3.0 results. In this bath, the casing is hardened or tanned. The casing passes over a series of rollers in the tanning solution to provide multiple passes giving a residence time of at least 1 minute in the bath.

From the tanning bath, the casing then passes into a wash bath where it is maintained for a period of about 10 minutes by a multiple pass arrangement. After washing, the casing passes through a plasticizing bath consisting of 5% glycerin in water. From the plasticizing bath the casing passes through a dryer where it is inflated with compressed air and dried by circulation of heated air over the surface of the inflated casing. The casing is dried by air maintained at a temperature of 70° C. circulated at a rate of 200 feet per minute.

After drying, the casing is preferably shirred. It may be first reeled and then shirred prior to packaging.

Casings made by the above described method are uniform in diameter and in wall thickness. The tanning of the casing with aluminum sulfate, sodium citrate, and sodium carbonate solution if effective to produce a strong coherent film having a high longitudinal and transverse strength, both dry and rewet. The casing prepared as described above could be shirred without difficulty using a shirring machine of the type used for the shirring of regenerated cellulose casing. The shirred casing could be stuffed, linked, and cooked without difficulty.

Example 5

In this example, the preparation of edible sausage casings from peanut protein is illustrated.

A 20% dispersion of a commercial peanut meal protein concentrate containing 88% protein in an aqueous 4% sodium hydroxide solution is prepared and homogenized. The resultant swollen protein dispersion is then pumped under pressure through the extrusion die as previously described into a coagulating bath consisting of 42% ammonium sulfate (sodium sulfate can also be used) in water. When the peanut protein is extruded as a thin-walled tube into this concentrated solution of ammonium sulfate, the tube is dehydrated and collapsed to form a film which is sufficiently coherent for further processing. As shown in FIG. 1 of the drawings, the coagulation bath is circulated both inside and outside the tube to maintain the tube in an inflated condition and insure proper coagulation of the casing both on the inside and outside.

After the film is coagulated in the ammonium sulfate solution, it is necessary to tan the film to give the film sufficient strength for further processing and for stuffing with sausage meat. If the film were taken from the ammonium sulfate coagulating bath and were dried, a film would be produced which has moderate strength in the dry state but which would be considerably weakened upon contact with water. It is, therefore, necessary for the casing to be tanned or hardened to provide the wet and dry strength in the finished product required in an edible casing.

For the coagulation bath, the casing next passes into a tanning bath which comprises a solution of 10% ferric ammonium sulfate and 20% ammonium sulfate and having a pH of 3.0. In this bath, the casing is hardened or tanned. The casing passes over a series of rollers in the ferric ammonium sulfate solution to provide multiple passes giving a residence time of at least 1 minute in the bath.

From the tanning bath, the casing then passes into a wash bath where it is maintained for a period of about 10 minutes by a multiple pass arrangement. After washing, the casing passes through a plasticizing bath consisting of 5% glycerin in water. From the plasticizing bath the casing passes through a dryer where it is inflated with compressed air and dried by circulation of heated air over the surface of the inflated casing. The casing is dried by air maintained at a temperature of 70° C. circulated at a rate of 200 feet per minute.

After drying, the casing is preferably shirred. It may be first reeled and then shirred prior to packaging.

Casings made by the above described method are uniform in diameter and in wall thickness. The tanning of the casing with ferric ammonium sulfate solution is effective to produce a strong coherent film having a high longitudinal and transverse strength, both dry and rewet. The casing prepared as described above could be shirred without difficulty using a shirring machine of the type used for the shirring of regenerated cellulose casing. The shirred casing could be stuffed, linked, and cooked without difficulty.

Example 6

In this example, the preparation of edible sausage casings from soybean protein is illustrated.

A 30% dispersion of a commercial soybean protein containing 95% protein in an aqueous 6% sodium hydroxide solution is prepared and homogenized. The resultant swollen soybean dispersion is then pumped under pressure through the extrusion die as previously described into a coagulating bath consisting of 42% ammonium sulfate (sodium sulfate can also be used) in water. When the dispersion is extruded as a thin-walled tube into this concentrated solution of ammonium sulfate, the tube is dehydrated and collapsed to form a film which is sufficiently coherent for further processing. As shown in FIG. 1 of the drawings, the coagulation bath is circulated both inside and outside the tube to maintain the tube in an inflated condition and insure proper coagulation of the casing both on the inside and outside.

After the film is coagulated in the ammonium sulfate solution, it is necessary to tan the film to give the film sufficient strength for further processing and for stuffing with sausage meat. If the film were taken from the ammonium sulfate coagulating bath and were dried, a film would be produced which has moderate strength in the dry state but which would be considerably weakened upon contact with water. It is, therefore, necessary for the casing to be tanned or hardened to provide the wet and dry strength in the finished product required in an edible casing.

From the coagulation bath, the casing next passes into a tanning bath which comprises an aqueous solution of 25% glutaraldehyde buffered to an initial pH of 5.7 with sodium acetate. In this bath, the casing is hardened or tanned. The casing passes over a series of rollers in the tanning solution to provide multiple passes giving a residence time of at least 0.5 minute in the bath.

From the tanning bath, the casing then passes into a wash bath where it is maintained for a period of about 10 minutes by a multiple pass arrangement. After washing, the casing passes through a plasticizing bath consisting of 5% glycerin in water. From the plasticizing bath the casing passes through a dryer where it is inflated with compressed air and dried by circulation of heated air over the surface of the inflated casing. The casing is dried by air maintained at a temperature of 70° C. circulated at a rate of 200 feet per minute.

After drying, the casing is preferably shirred. It may be first reeled and then shirred prior to packaging.

Casings made by the above described method are uniform in diameter and in wall thickness. The tanning of the casing with glutaraldehyde solution is effective to produce a strong coherent film having a high longitudinal and transverse strength, both dry and rewet. The casing prepared as described above could be shirred without difficulty using a shirring machine of the type used for the shirring of regenerated cellulose casing. The shirred casing could be stuffed, linked, and cooked without difficulty.

Example 7

In this example, the preparation of another edible sausage casing from wheat protein is illustrated.

A 15% dispersion of a commercial wheat protein product containing 90% protein in an aqueous 2% sodium hydroxide solution is prepared and homogenized. The resultant swollen protein dispersion is then pumped under pressure through the extrusion die as previously described into a coagulating bath consisting of 40% sodium sulfate in water. When the dispersion is extruded as a thin-walled tube into this concentrated solution of sodium sulfate, the tube is dehydrated and collapsed to form a film which is sufficiently coherent for further processing. As shown in FIG. 1 of the drawings, the coagulation bath is circulated both inside and outside the tube to maintain the tube in an inflated condition and insure proper coagulation of the casing both on the inside and outside.

After the film is coagulated in the sodium sulfate solution, it is necessary to tan the film to give the film sufficient strength for further processing and for stuffing with sausage meat. If the film were taken from the sodium sulfate coagulatng bath and were dried, a film would be produced which has moderate strength in the dry state but which would be considerably weakened upon contact with water. It is, therefore, necessary for the casing to be tanned or hardened to provide the wet and dry strength in the finished product required in an edible casing.

From the coagulation bath, the casing next passes into a tanning bath which comprises an aqueous 5% solution of formaldehyde buffered to a pH of about 5.3 with sodium hexametaphosphate. In this bath, the casing is hardened or tanned. The casing passes over a series of rollers in the tanning solution to provide multiple passes giving a residence time of at least 0.5 minute in the bath.

From the tanning bath, the casing then passes into a wash bath where it is maintained for a period of about 10 minutes by a multiple pass arrangement. After washing, the casing passes through a plasticizing bath consisting of 5% glycerin in water. From the plasticizing bath the casing passes through a dryer where it is inflated with compressed air and dried by circulation of heated air over the surface of the inflated casing. The casing is dried by air maintained at a temperature of 70° C. circulated at a rate of 200 feet per minute.

After drying, the casing is preferably shirred. It may be first reeled and then shirred prior to packaging.

Casings made by the above described method are uniform in diameter and in wall thickness. The tanning of the casing with formaldehyde solution is effective to produce a strong coherent film having a high longitudinal and transverse strength, both dry and rewet. The casing prepared as described above could be shirred without difficulty using a shirring machine of the type used for the shirring of regenerated cellulose casing. The shirred casing could be stuffed, linked, and cooked without difficulty.

In the several examples given above, the vegetable protein was provided with glycerol as a plasticizer. In carrying out the preparation of casings in accordance with this invention, any plasticizer, e.g. in amounts ranging up to about 50% of vegetable protein in material may be used which is suitable for producing a flexible film. Glycerol is the preferred and most widely used plasticizer for vegetable protein films, but in general high boiling water-soluble organic compounds containing hydroxyl, amide, or amino groups may be used. Suitable plasticizers include glycols and polyglycols, sorbitol, urea, etc., or derivatives thereof.

The casings produced in the processes of the above examples are essentially colorless. Similar processes, however, can be utilized in the production of colored casings. Such colored casings, for example, may be produced by incorporating F.D.A. and U.S.D.A. approved pigments or dyes into the starting resin dispersion and/or into baths in which the resin film is treated. In particular, aluminum lake pigments of F.D.A. approved food dyes may be used.

It will be further understood that the invention also embraces the addition to the vegetable protein films, usually through an addition to a starting dispersion, of minor amounts, e.g. up to about 45% by weight, of other film-forming resins, e.g. alginates, starch, amylose, collagen, etc., provided such resins are compatible with the vegetable protein resin and the conditions utilized and do not seriously detract from the charateristic advantages gained by virtue of the use of vegetable proteins as the primary film component.

Other embodiments which do not depart from the spirit and scope of the present invention, of course, will be apparent to those skilled in the art. Accordingly, it will be understood the present invention is to be limited only by the scope of the appended claims.

What is claimed is:

1. An edible meat casing comprising a tubular film consisting essentially of vegetable protein having an average D.P. of at least 50, derived from corn, wheat, peanuts or soy beans, tanned and insolubilized with a non-toxic tanning agent and plasticized.

2. An edible casing according to claim 1 wherein said tanned vegetable protein is heavy metal salt- or aldehyde-tanned vegetable protein.

3. An edible casing according to claim 2 wherein said tanned vegetable protein is aluminum- or iron-tanned vegetable protein.

4. An edible casing according to claim 2 wherein said tanned vegetable protein is formaldehyde-, glutaraldehyde-, or liquid smoke-tanned vegetable protein.

5. An edible casing according to claim 1 wherein said tanned vegetable protein is heavy metal salt- or aldehyde-tanned protein.

6. An edible casing according to claim 5 wherein said tanned vegetable protein is aluminum- or iron-tanned vegetable protein.

7. An edible casing according to claim 5 wherein said tanned vegetable protein is formaldehyde-, glutaraldehyde-, or liquid smoke-tanned vegetable protein.

References Cited

UNITED STATES PATENTS

| | | | |
|---|---|---|---|
| 2,592,120 | 4/1952 | Caldwell | 106—154 |
| 2,665,966 | 1/1954 | Thomson | 106—161 |
| 2,896,254 | 7/1959 | Braun | 99—175 X |
| 2,897,547 | 8/1959 | Weingand | 99—176 X |
| 3,310,446 | 3/1967 | Georgevits | 106—154 X |
| 3,329,509 | 7/1967 | Julius | 99—175 X |
| 3,408,917 | 11/1968 | Cohly | 99—176 |
| 3,533,809 | 10/1970 | Cohly et al. | 99—176 |
| 3,118,959 | 1/1964 | Westeen | 106—161 X |

FOREIGN PATENTS

| | | | |
|---|---|---|---|
| 569,212 | 5/1945 | Great Britain | 99—176 |
| 711,437 | 6/1954 | Great Britain | 99—176 |

FRANK W. LUTTER, Primary Examiner

R. HALPER, Assistant Examiner

U.S. Cl. X.R.

106—154